United States Patent [19]
Zirker et al.

[11] 4,244,405
[45] Jan. 13, 1981

[54] TREE SHEAR HEAD AND CONTROLS THEREFOR

[75] Inventors: Eugene S. Zirker; Andrew P. Redman; Victor C. Pierrot; Alvin L. Menzel; Lynn E. Kurt, all of Dubuque, Iowa

[73] Assignee: Deere & Company, Moline, Ill.

[21] Appl. No.: 9,755

[22] Filed: Feb. 5, 1979

[51] Int. Cl.³ .............................................. A01G 23/08
[52] U.S. Cl. ................................ 144/34 E; 144/3 D; 91/520; 91/526; 91/531
[58] Field of Search ................. 91/520, 526, 527, 531; 60/484; 144/2 Z, 3 D, 34 R, 34 E, 309 AC

[56] References Cited
U.S. PATENT DOCUMENTS

| 3,875,983 | 4/1975 | Kurelek | 144/34 R |
| 3,910,326 | 10/1975 | Tucek | 91/527 X |
| 3,994,325 | 11/1976 | Cryder et al. | 144/34 E |
| 4,039,009 | 8/1977 | Lindblom | 144/34 E |
| 4,039,010 | 8/1977 | Tucek | 144/34 R |
| 4,077,445 | 3/1978 | Wirt | 91/520 X |

Primary Examiner—W. Donald Bray

[57] ABSTRACT

A tree shear head includes a shear, a grapple tong and an accumulator tong which are positioned by respective double-acting hydraulic actuators controlled by selectively actuatable solenoid-operated valves such as to place the shear head either in a non-accumulate mode wherein both tongs operate concurrently to grasp and release trees one-by-one or an accumulate mode wherein the tongs are individually operated in a sequence resulting in the accumulation of a plurality of cut trees.

4 Claims, 4 Drawing Figures

TREE SHEAR HEAD AND CONTROLS THEREFOR

BACKGROUND OF THE INVENTION

The present invention relates to tree shear heads capable of accumulating a plurality of cut trees and more specifically relates to improvements in shear heads of the type disclosed in U.S. Pat. No. 3,862,652 granted to Johnson on Jan. 28, 1975.

The tree shear head disclosed in the above-identified Johnson patent includes a main upright frame to which a pair of laterally spaced grapple tongs are pivotally mounted for movement between open and closed positions for selectively gripping trees against the frame and releasing sheared trees from the shear head. The tongs are selectively moved by hydraulic actuators which are connected in parallel with each other and to a control valve such as to be concurrently opened and closed. Thus, the tongs are not adapted to be used to accumulate trees one-by-one in the shear head as might be desired when working in thick stands of trees which are relatively small in diameter.

Tree shear heads having accumulating ability are known in the art. An example of such a tree shear head is disclosed in U.S. Pat. No. 3,910,326 granted to Tucek on Oct. 7, 1975. The shear head disclosed in the Tucek patent is somewhat similar to that disclosed in the above-mentioned Johnson patent to the extent that it has a pair of grapple tongs selectively opened and closed by respective actuators connected in parallel for concurrent controlled actuation by means of one direction control valve. However, the Tucek design additionally includes an accumulator tong, an actuator for this tong and additional circuitry for controlling the accumulator tong actuator. This additional circuitry is connected to the lines for conveying pressure and exhaust fuild to and from the grapple tong actuators and includes a set of four check valves which operate to route fluid to and from a solenoid-operated, two-position, four-way valve coupled to the accumulator tong actuator such that when the last-mentioned valve is in a normal de-activiated position, the actuator will act to maintain the accumulator tong in a closed position during both opening and closing of the grapple tongs. This is the mode of operation of the shear head when trees are not being accumulated. When it is desired to accumulate sheared trees, the solenoid-operated valve is momentarily energized such that the flow of fluid to the accumulator tong actuator is momentarily reversed to effect cycling of the accumulator tong from a closed position behind a tree just sheared to a closed position against a forward portion of the tree.

While the Tucek design teaches how a pre-existing shear head having no accumulating capabilities may be modified to have such capabilities, the manner chosen is not compatible with the aforementioned Johnson shear head since the latter is considerably more vertically compact than is the Tucek shear head and has no room for an additional tong to be mounted on the frame thereof.

SUMMARY OF THE INVENTION

According to the present invention there is provided an improved tree shear head having tree accumulating capabilities.

An object of the invention is to provide a tree shear head having accumulating capabilities and utilizing only one grapple tong and one accumulator tong.

Another object of the invention is to provide a tree shear head, as set forth in the previous object, wherein hydraulic actuators for the tongs are controlled by means of solenoid-operated control valves selectively actuated by means of a pair of three-position switches having certain normal positions and certain detented positions which contribute to easy operation of the shear head while minimizing tree damage.

A more specific object of the invention is to provide a tree shear having a grapple tong which is sufficiently long to reach completely across an entrance zone through which trees must pass when being located in a position for being sheared or when being dumped from the shear head.

These and other objects will become apparent from reading the ensuing description together with the appended drawings.

DESCRIPTION OF THE PREFERRED EMBODIMENT

Figure 1:
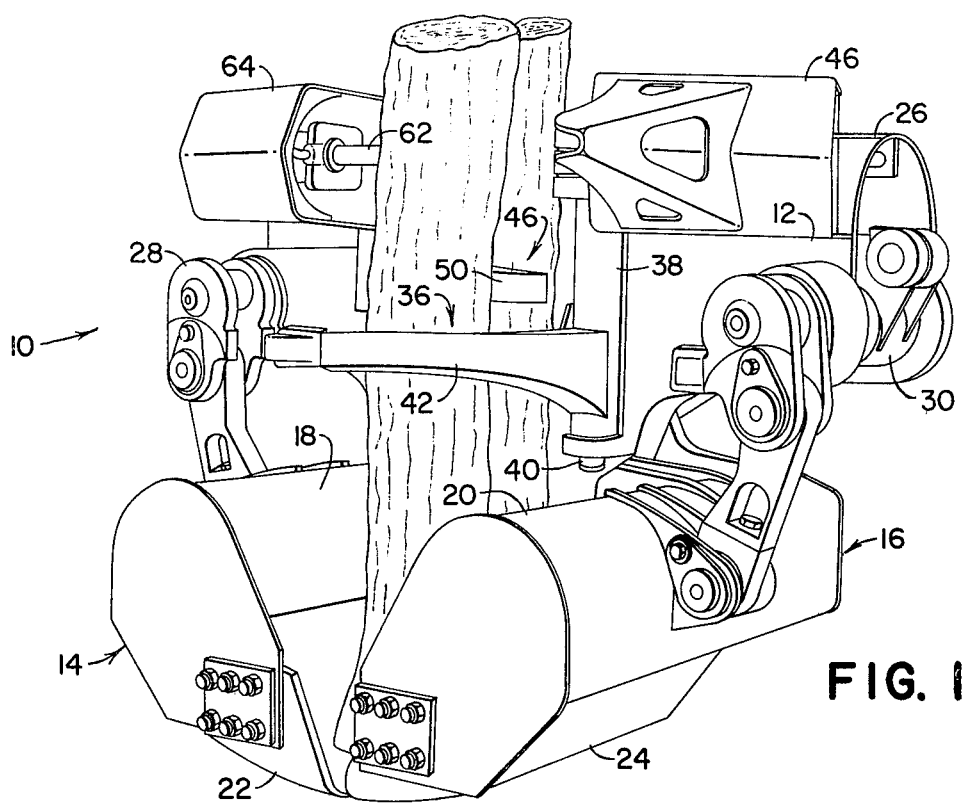
FIG. 1 is a left front perspective view of the tree shear head showing the accumulator tong gripping a first sheared tree and the grapple tong gripping a second tree to be cut.
Figure 2:
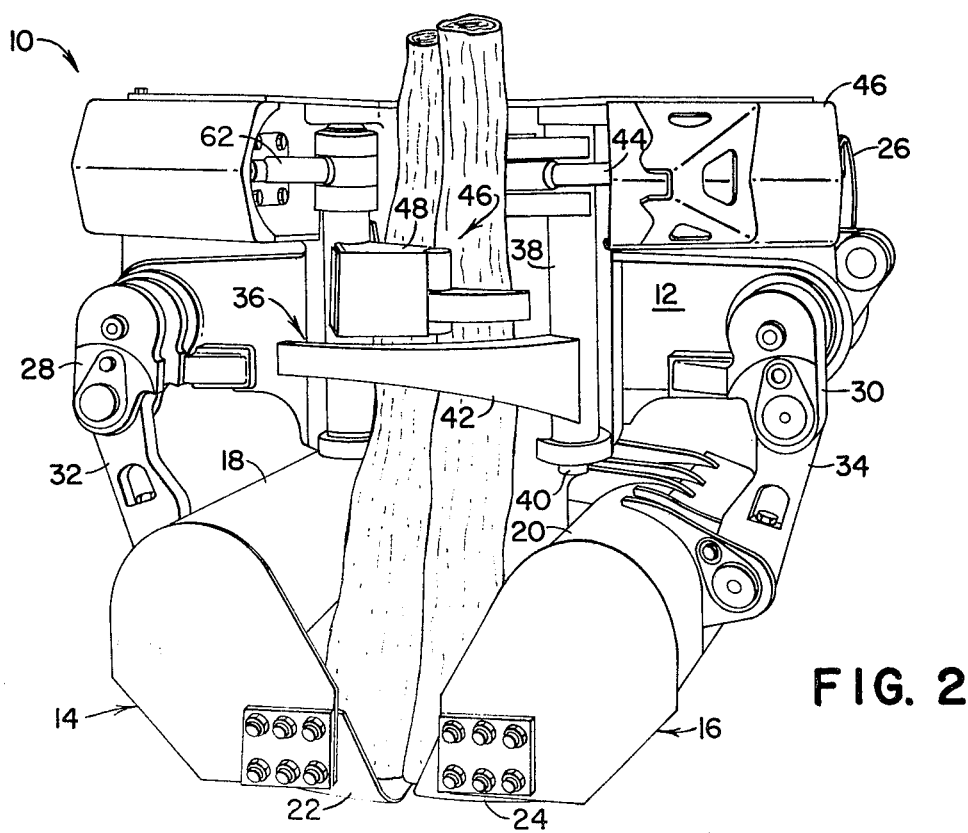
FIG. 2 is a left front perspective view of the tree shear head showing the accumulator and grapple tongs cooperating to grasp two sheared trees.

Referring now to FIGS. 1 and 2, therein is shown a tree shear head 10 which embodies the present invention. Specifically, the shear head 10 includes a relatively short upright frame 12 having right and left shear blade support arms 14 and 16 mounted for vertical pivotal movement about a horizontal, fore-and-aft extending pivot pin (not shown) journalled in a lower central portion of the frame 12. The arms 14 and 16 respectively include fore-and-aft extending portions 18 and 20 to which shear blades 22 and 24 are respectively bolted. The blades 22 and 24 include respective cutting edges which are moved away from each other to fully open positions and toward each other to fully closed positions respectively in response to the arms 14 and 16 being raised and lowered about the pivot pin. Provided for powering the blades between their open and closed positions is a compound double-acting, hydraulic shear blade actuator (not shown) positioned in a horizontal housing 26 formed by and disposed transversely in an upper portion of the frame 12. The shear blade actuator has piston rods projecting from its opposite ends and respectively connected to right and left crank shafts 28 and 30 journaled in laterally spaced locations in the frame adjacent the opposite ends of the housing 26. The shafts 28 and 30 are respectively linked to the arms 14 and 16 by links 32 and 34 such that extension and retraction of the shear blade actuator will result in closing and opening of the shear blades.

Mounted on the left front side of the frame 12 is a grapple tong 36 having a vertical tubular inner end 38 received on a vertical pivot pin 40 mounted in vertically spaced lugs on the frame. The grapple tong 36 is swingable about the pin 40 between a closed position, wherein a tree gripping arm portion 42 thereof extends transversely across a zone forwardly of the frame 12, as illustrated, and an open position wherein the portion 42 projects mainly fore-and-aft from the frame 12. Provided for powering the grapple tong between its open and closed positions is a double-acting, hydraulic grapple tong actuator 44 located within a housing 46 and having its cylinder and rod ends respectively pivotally connected to the frame 12 and the inner end 38 of the tong 36.

Figure 3:
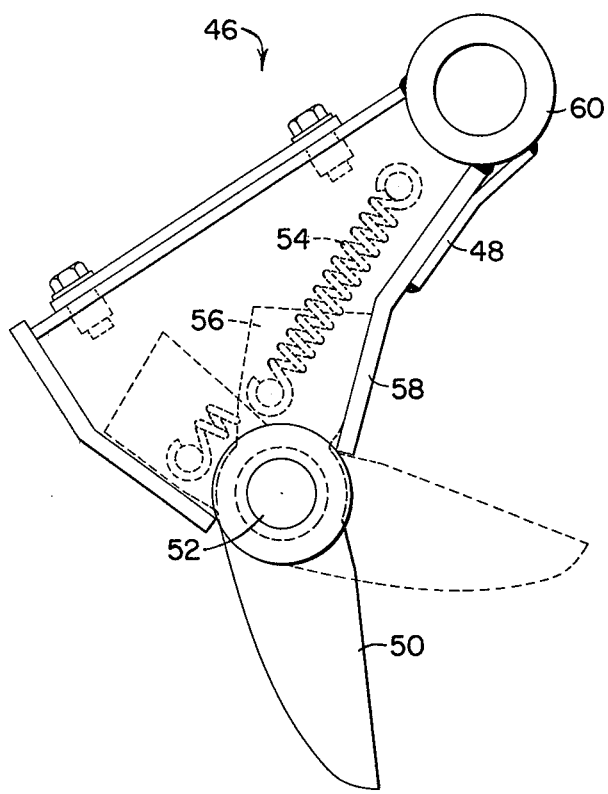
FIG. 3 is a top plan view of the accumulator tong and, illustrating in dashed lines, a yieldably collapsed position of an outer portion of the tong.

Mounted on the right front side of the frame 12 in a manner similar to that described for mounting the grapple tong 36 is an accumulator tong 46. As can best be seen in FIG. 3, the tong 46 includes a tree-gripping arm comprising an inner hollow portion 48 and an outer portion 50 respectively pivotally interconnected by a vertical pivot pin 52. Yieldably holding the outer portion 50 in a normal working position relative to the inner portion 48 is a tension spring 54 having opposite ends respectively connected between the portions 48 and 50 so as to hold an inner projection 56 of the outer portion 50 against a vertical plate 58 forming part of the portion 48 and preventing the outer portion from pivoting clockwise beyond its working position about the pivot pin 52. A vertical cylindrical tube 60 forms an inner end of the inner portion 48 and is received on a pin carried by the frame 12. The tong 46 is swingable about this pin between a closed position, wherein the tong extends transversely across and is adapted for gripping a tree against the frame 12, as illustrated, and an open position wherein the tong projects generally fore-and-aft. Provided for powering the tong 46 between its open and closed positions is a double-acting, hydraulic accumulator tong actuator 62 located in a housing 64 and having cylinder and rod ends respectively pivotally connected to the frame 12 and cylindrical tube 60 of the tong 46.

Figure 4:
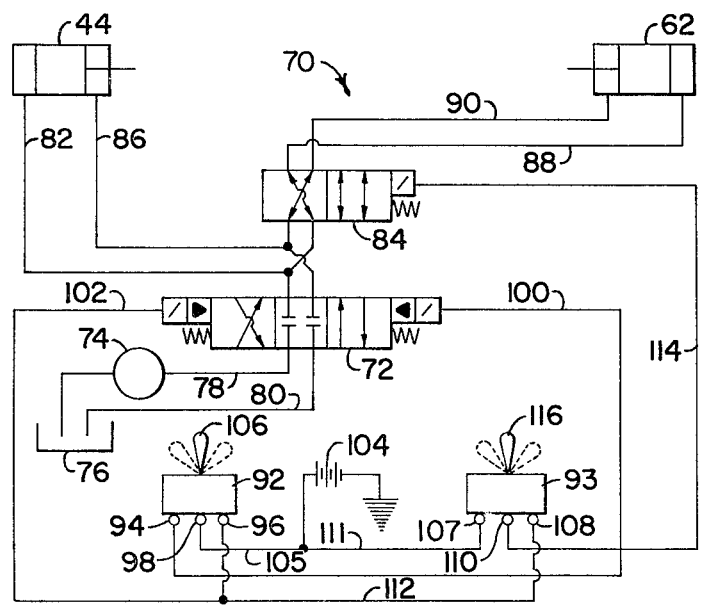
FIG. 4 is a schematic view of the electro-hydraulic control system for controlling the grapple and accumulator tong actuators.

Referring now to FIG. 4, therein is shown an electrohydraulic control system 70 for controlling the operation of the grapple and accumulator tong actuators 44 and 62 and, consequently, the tongs 36 and 46. The control system 70 includes a main control valve 72 which is a solenoid-operated, three-position, four-way valve. A pump 74 and a sump 76 are respectively connected to the valve 72 by pressure and return lines 78 and 80. A first branched supply-exhaust line 82 connects one port of the valve 72 to a first end of the grapple tong actuator 44 and one port of a control valve 84, while a second branched supply-exhaust line 86 connects a second port of the valve 72 to a second end of the actuator 44 and a second port of the valve 84. The valve 84 is a solenoid-operated, two-position, four-way valve, which is connected to the opposite ends of the accumulator tong actuator 62 by means of supply-exhaust lines 88 and 90.

The valve 84 is illustrated in a normal de-activated position wherein it in effect connects the accumulator tong actuator 62 in parallel with the grapple tong actuator 44 for concurrent operation as established by activation of the valve 72 to first and second active positions at opposite sides of the disclosed de-activated neutral position. Activation of the valve 84 shifts it to its active position wherein it causes the actuator 62 to operate oppositely to the actuator 44.

The solenoid valves 72 and 84 are respectively selectively controlled electrically via circuitry including a first and second three-position switches 92 and 93. The switch 92 includes terminals 94 and 96 respectively located at opposite sides of a central terminal 98 and respectively connected to solenoid terminals at the opposite ends of the valve 72 by means of leads 100 and 102. A source of electrical current in the form of a battery 104 is connected to the middle terminal 98 via a lead 105. The switch 92 includes a lever 106 biased to a central position as shown in FIG. 4, wherein it disconnects the terminals 94, 96 and 98 from each other. The lever 106 is movable leftwardly from its central position to a detented tong-close position, wherein it establishes a connection between the terminals 94 and 98 and is movable rightwardly from its central position to a detented tong-open position wherein it establishes a connection between the terminals 96 and 98. Thus, it will be appreciated that the valve 72 is activated by moving the lever 106 rightwardly or leftwardly from its central position.

The switch 93 includes terminals 107 and 108 located on the opposite sides of a middle terminal 110 and respectively coupled to the battery 104, via a lead 111 and to the lead 102, via a lead 112. The central terminal 110 is connected to a solenoid of the valve 84 by a lead 114. The switch 93 includes a lever 116 biased to a central position wherein it connects the central terminal 110 to the terminal 108. The lever 116 is movable leftwardly from its central position to a non-accumulate position, wherein it disconnects the terminals 107, 108 and 110 one from another, and to a detented accumulate position, wherein it connects the middle terminal 110 to the terminal 107. Thus, it will be appreciated that the valve 84 is actuated when the switch lever 116 is in its central position and the switch lever 106 is in its open position or when the lever 116 is in its accumulate position.

The operation of the shear head 10 is as follows. Assuming that relatively large trees are being sheared, the tree head will be operating in a non-accumulate mode with the switch lever 116 located in its non-accumulate position for maintaining the solenoid valve 84 de-energized. The valve 84 thus remains in its illustrated de-energized position wherein it respectively connects the head and rod ends of the accumulator tong actuator 62 to the supply-exhaust lines 82 and 86. The shear head 10 is then readied for shearing a standing tree by simultaneously opening the shear blades 22 and 24, and the tongs 44 and 62, the opening of the tongs being effected by moving the switch lever 106 of the switch 92 to its detented open position wherein it connects the battery to the main control valve 72 such as to energize the latter to shift rightwardly from its illustrated central position to thus respectively connect the pump 74 and sump 76 to the lines 86 and 82 which results in simultaneous retraction of the tong actuators 44 and 62. The shear head 10 is then placed against the standing tree, with the latter being located between the blades 22 and 24 and tongs 36 and 46. The blades 22 and 24 and the tongs 14 and 62 are then concurrently closed by extending the blade actuators, and the tong actuators 44 and 62, the extension of the tong actuators being effected by moving the switch lever 106 of the switch 92 to its close position wherein it connects the battery 104 to the valve 72 such as to energize the latter to shift leftwardly, from its illustrated neutral position, to thus respectively connect the pump 74 and sump 76 to the lines 82 and 86.

The shear head 10 may be operated to shear and accumulate a number of trees of relatively small diameter by shearing an initial one of the trees in the manner described above, and then by readying the shear head to receive a second standing tree to be sheared by opening the shear blades 22 and 24, and the grapple tong 36 while retaining the accumulator tong 46 closed. The opening of the tong 36 is accomplished, as described above, by moving the switch lever 106 to its open position to thereby activate the valve 72 to move to the right. The accumulator tong 46 is kept closed by simultaneously moving the lever 116 of the switch 93 to its central position wherein it connects the lead 112 which is now energized since the lead 102 is energized, to the lead 114 to energize the valve 84 to cause the latter to shift leftwardly, from its illustrated de-activated position, such as to connect the pressure fluid in the line 86 to the head end of the actuator 62 while connecting the sump-connected line 82 to the rod end of the actuator 62. The shear head 10 is then positioned against the second tree and the shear blades 22 and 24, and the grapple tong 36 are then simultaneously closed while the accumulator tong 46 is opened, this operation of tong 46 being timed to occur prior to the second tree being gripped tightly thereagainst by the tong 36. Closing of the tong 36 and opening of the tong 46 are simultaneously respectively initiated by moving the lever 106 of the switch 92 to its close position and moving the lever 116 of the switch 93 to its accumulate position. Thus, the valve 72 is caused to shift from its rightward to its leftward position while the valve 84 is maintained in its leftward activated position. As the tong 46 opens, the outer end portion 50 will engage the second tree and rotate about the pivot pin 52 as is permitted by the spring 54. Once the end portion 50 moves past the second tree, the spring 54 returns the end portion to its normal working position. At this time the operator may release the switch lever 116 to permit the latter to return to its central position wherein it de-energizes the valve 84 and permits the latter to shift to its de-activated position such as to effect extension of the actuator 62 and hence closing of the accumulator tong 46 upon the second tree. At this time the shear blade actuator will either have already finished or be very close to finshing the powering of the blades 22 and 24 through the second tree.

Subsequent trees may be selectively sheared and accumulated one-by-one in a manner similar to that just described for shearing and accumulating a second tree.

Thus, it will be appreciated that the applicants have devised a simple shear head design and controls therefor by which only two tongs are necessary for gripping trees against the shear head frame during shearing thereof and for subsequently holding the sheared trees until a plurality thereof are accumulated.

We claim:

1. A tree shear head, comprising: a frame; a grapple tong and an accumulator tong respectively pivotally mounted on the frame for movement between respective tree-receiving or discharging open positions and respective tree-gripping closed positions; said accumulator tong including an outer portion yieldable pivotally mounted on the remainder of the accumulator tong for yielding relative to the latter only when the outer portion encounters a predetermined minimum resistance during opening of the accumulator tong; first and second double-acting hydraulic actuators respectively connected between the frame and the grapple and accumulator tongs; a pump; a sump; first and second solenoid-operated valves; pressure and return lines respectively coupling the pump and sump to the first valve; first and second supply-exhaust lines coupling the first valve to the first actuator and to the second valve; third and fourth supply-exhaust lines coupling the second valve to the second actuator; said first valve being a three-position, four-way valve shiftable to first and second activated positions at the opposite sides of a neutral de-activated position for respectively actuating the first actuator to effect closing and opening of the grapple tong; said second valve being a two-position, four-way valve shiftable between a de-activated normal position and an activated position for respectively actuating the second actuator to effect closing and opening of the accumulator tong respectively when the first valve is in its first and second activated positions; and electrical control circuit means connected to the first and second valves and including a source of electrical current and switch means, the latter being operable for selectively effecting separate or concurrent activation of the first and second valves, whereby the grapple and accumulator tongs may be either opened and closed together, when the shear head is operating in a non-accumulating mode, or opened and closed individually to hold a cut tree or trees while grasping a further tree to be subsequently cut when the shear head is operating in an accumulating mode.

2. The tree shear head defined in claim 1 wherein the switch means includes a first three-position switch connected between the source of electrical current and the first valve and movable between a neutral position, disconnecting current from the first valve, and first and second positions for activating the first valve to respectively shift to its first and second positions; and a second three-position switch connected between the source of electrical current and the second valve and to the first switch and movable among a non-accumulate position interrupting current flow to the second valve, an accumulate position connecting current to the second valve to actuate the same and a third position connecting current to the second valve only when the first switch is in its second position.

3. The tree shear head defined in claim 2 wherein the first and second positions of the first switch are detented positions and wherein the non-accumulate position of the second switch is a detented position; and said second switch being biased toward its third position.

4. A tree shear head comprising: an upright frame; a shear mounted on a lower portion of the frame for movement between stem-receiving and stem-shearing positions; a grapple tong and an accumulator tong pivotally mounted on the frame one above the other at a location above the shear for movement between respective open and closed positions; the accumulator tong having a yieldably pivoted outer end portion adapted for yielding upon encountering a standing tree stem when the accumulator tong is moving to its open position; first and second double-acting hydraulic actuators respectively coupled between the frame and the grapple tong and the accumulator tong for respectively moving grapple and accumulator tongs between their respective open and closed positions; a control system for the actuators including: a pump; a reservior; solenoid-operated grapple tong and accumulator tong control valves; supply and return lines respectively connecting the pump and reservoir to the grapple tong control valve; a first pair of pressure-exhaust lines connecting the grapple tong control valve to each of the first actuator and the accumulator tong control valve; a third pair of pressure-exhaust lines connecting the last-named valve to the second actuator; said grapple tong control valve being shiftable from a central position, wherein it blocks fluid in the first and second actuators, to a first active position wherein it routes fluid to and from the first actuator to effect movement of the grapple tong to its closed position, and to a second active position wherein it routes fluid to and from the first actuator to effect movement of the grapple tong to its open position; said accumulator tong control valve being shiftable from a normal position, wherein it routes fluid to and from the second actuator such as to effect movement of the accumulator tong to its closed and open positions respectively when the grapple tong control valve is in its first and second active positions, and an active position, wherein it routes fluid to and from the second actuator such as to effect movement of the accumulator tong to its open and closed positions respectively when the grapple tong control valve is in its first and second active positions; electrical circuit means connected to the grapple tong and the accumulator tong control valves and including switch means operable for selectively actuating only the first valve to effect a non-accumulating mode establishing concurrent movement of the grapple and accumulator tongs between their respective open and closed positions and for the accumulator tong between its open and closed position.

* * * * *